(12) United States Patent
Wu et al.

(10) Patent No.: US 8,291,197 B2
(45) Date of Patent: Oct. 16, 2012

(54) AGGRESSIVE LOOP PARALLELIZATION USING SPECULATIVE EXECUTION MECHANISMS

(75) Inventors: Yuguang Wu, Mountain View, CA (US); Jin Lin, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 561 days.

(21) Appl. No.: 11/673,905

(22) Filed: Feb. 12, 2007

(65) Prior Publication Data

US 2008/0195847 A1 Aug. 14, 2008

(51) Int. Cl.
- G06F 15/00 (2006.01)
- G06F 9/30 (2006.01)
- G06F 9/40 (2006.01)

(52) U.S. Cl. ...................................... 712/216
(58) Field of Classification Search .................. 712/216; 717/160

See application file for complete search history.

(56) References Cited

U.S. PATENT DOCUMENTS

| | | | |
|---|---|---|---|
| 5,903,749 A * | 5/1999 | Kenner et al. ................. | 712/226 |
| 6,182,210 B1 * | 1/2001 | Akkary et al. ................. | 712/235 |
| 6,463,523 B1 * | 10/2002 | Kessler et al. ................ | 712/216 |
| 6,542,984 B1 * | 4/2003 | Keller et al. .................. | 712/214 |
| 6,564,315 B1 * | 5/2003 | Keller et al. .................. | 712/214 |
| 6,615,403 B1 * | 9/2003 | Muthukumar et al. ....... | 717/160 |
| 6,622,235 B1 * | 9/2003 | Keller et al. ................... | 712/23 |
| 7,051,193 B2 | 5/2006 | Wang et al. | |
| 7,171,544 B2 | 1/2007 | Bera | |
| 2002/0178349 A1 * | 11/2002 | Shibayama et al. .......... | 712/235 |
| 2004/0117781 A1 | 6/2004 | Bera | |
| 2004/0123280 A1 * | 6/2004 | Doshi et al. ................... | 717/161 |
| 2005/0131977 A1 | 6/2005 | Bera | |
| 2005/0188364 A1 | 8/2005 | Cockx et al. | |
| 2005/0198627 A1 * | 9/2005 | Du et al. ........................ | 717/160 |
| 2005/0216705 A1 * | 9/2005 | Shibayama et al. .......... | 712/216 |
| 2006/0048119 A1 | 3/2006 | Ren et al. | |
| 2006/0048122 A1 | 3/2006 | Barton et al. | |
| 2006/0174083 A1 * | 8/2006 | Barrick et al. ................ | 711/169 |
| 2007/0079298 A1 | 4/2007 | Tian et al. | |
| 2007/0094652 A1 * | 4/2007 | Chia et al. ..................... | 717/151 |

(Continued)

OTHER PUBLICATIONS

Dundas et al. (Improving Data Cache Performance by Pre-Executing Instructions Under a Cache Miss, 1997, pp. 68-75).*

(Continued)

Primary Examiner — Eddie P Chan
Assistant Examiner — George Giroux
(74) Attorney, Agent, or Firm — Robert C. Kowert; Meyertons, Hood, Kivlin, Kowert & Goetzel, P.C.

(57) ABSTRACT

A system and method for aggressive loop parallelization using speculative execution is disclosed. The method may include transforming code of a target application for concurrent execution, which may include adding an instruction to create a global address table entry for each store operation on which a load operation of a different loop iteration is dependent. The method may include replacing a standard load instruction with a special instruction configured to determine if an operand address of the load matches an operand address in one of the global address table entries. Another special instruction may remove a table entry following execution of the corresponding store operation. If an operand address of a load of a currently executing thread matches an operand address in the global address table, the method may include setting a checkpoint, completing execution of the thread in a pre-fetch mode, and re-executing the thread from the checkpoint.

19 Claims, 4 Drawing Sheets

U.S. PATENT DOCUMENTS

| | | |
|---|---|---|
| 2007/0157184 A1 | 7/2007 | Liu et al. |
| 2007/0169057 A1 | 7/2007 | Silvera et al. |
| 2007/0169061 A1 | 7/2007 | Bera |
| 2007/0192540 A1* | 8/2007 | Gara et al. .................... 711/117 |
| 2007/0255929 A1 | 11/2007 | Kasahar et al. |
| 2007/0283337 A1 | 12/2007 | Kasahar et al. |

OTHER PUBLICATIONS

Li et al., Compiler Techniques for Concurrent Multithreading with Hardware Speculation Support, 1997, pp. 175-191.*

* cited by examiner

AGGRESSIVE LOOP PARALLELIZATION USING SPECULATIVE EXECUTION MECHANISMS

BACKGROUND OF THE INVENTION

1. Field of the Invention

This invention relates to computing systems and more particularly to parallelization of software loops and speculative execution thereof.

2. Description of the Relevant Art

In computing systems employing multi-threaded parallel execution, the runtime of a software application may be reduced if two or more iterations of a loop in the software application can be executed in parallel. For example, it may be advantageous to dispatch a separate thread to execute each of two or more iterations of the loop in parallel. In the ideal scenario, each iteration may be executed independently by a separate thread without interference from any other iterations, thus producing a linear speedup in runtime dependent on the number of available hardware threads (strands) or CPU cores. However, in many cases the iterations of a loop may be dependent on each other. For example, a load operation in one iteration may be dependent on the result of a store operation of another iteration (e.g., a store operation in what would have been a previous iteration, if the iterations were executed in their original sequence.)

Compiler analysis can be used to in an attempt to determine the dependencies between the iterations of a loop. However, loop parallelization is often hampered by imprecise compiler analysis, as complete alias and dependence analysis can be costly and very difficult to achieve. Thread speculation can compensate for imprecise alias and dependence information, in some cases. However, prior art techniques employ speculative loop parallelization in an optimistic fashion, with periodic correctness checking during execution or at the end of each iteration of the loop. If the speculation proves to be incorrect, the speculative execution is either rolled back or discarded, therefore the execution resources have been wasted. Prior art approaches are also limited in that they often require a large table to maintain all store information, including store addresses and store values, for each speculative thread.

SUMMARY

A system and method may support aggressive loop parallelization through thread speculation. The method may include analyzing program instructions for implementing a software loop to identify one or more load operations in each loop iteration that are data dependent on store operations of another loop iteration. The method may in some embodiments include transforming the program instructions for speculative loop execution dependent on results of such an analysis and partitioning loop iterations of the transformed program instructions into two or more threads configured for concurrent execution. Each thread may include one or more loop iterations, in different embodiments.

For each of the threads, the method may include dispatching the thread for execution on a processor or strand resource and speculatively executing a loop iteration included in the thread. The threads may be dispatched in program order (e.g., in order of their loop index values) but may not complete their execution in program order. Therefore, the method may in some embodiments include determining if a load operation in a currently executing loop iteration is dependent on results of a store operation of a different thread that has not yet completed execution.

If it is determined that no load operations of a currently executing loop iteration are dependent on results of a store operation of a different thread that has not yet completed execution, preliminary results of the speculatively executed loop iteration may be validated and committed to the architectural state of the system. If it is determined that a load operation of a currently executing loop is dependent on results of a store operation of a different thread that has not yet completed execution, the method may include setting a checkpoint corresponding to the load operation (e.g., immediately prior to the load operation) and completing execution of the thread in a pre-fetch mode without validating or committing preliminary results of the load operation or any subsequent operations in the currently executing loop iteration. In some embodiments, a thread that completes execution in pre-fetch mode may remain in the thread queue or be placed at the end of the thread queue following completion in pre-fetch mode, and may be re-executed from the checkpoint when it is dispatched for re-execution from the thread queue.

In some embodiments, executing each thread includes executing an initialization portion and a computation portion. The initialization portion may include code to create an entry in a global address table corresponding to each store operation on which a load operation of a different thread is dependent and each entry may include an operand address. In such embodiments, determining if a load operation of the thread is dependent on results of a store operation of a different thread that has not yet completed execution may involve determining if an operand address of the load operation matches an operand address included in an entry in the global address table.

In some embodiments, the method described herein may be largely implemented in software, with hardware support. This hardware support may include a memory configured to store the global address table and/or one or more private tables for each processor or strand to store preliminary results of store operations of a thread on which load operations of another thread are dependent. The hardware support may in some embodiments also include execution logic to implement specialized instructions, such as an instruction to create an entry in the global address table, an instruction to remove an entry from the global address table, and an instruction to replace a standard load operation with a special load instruction that determines if an operand address of a load operation matches an operand address included in an entry in the global address table in addition to performing the load operation.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A system and method for speculative loop parallelization of software instructions is disclosed. In some embodiments, the approach relies on both compiler analysis and low-level hardware speculation mechanisms. It may in various embodiments use dependence profiling and/or compiler heuristics to obtain approximate dependence information in the loop, and then use thread speculation to verify such information at runtime. Store-address tables may be employed during thread execution to provide hardware support for aggressive thread speculation. Such a method may be especially efficient when used in conjunction with application code loops having weak dependencies.

Figure 1:
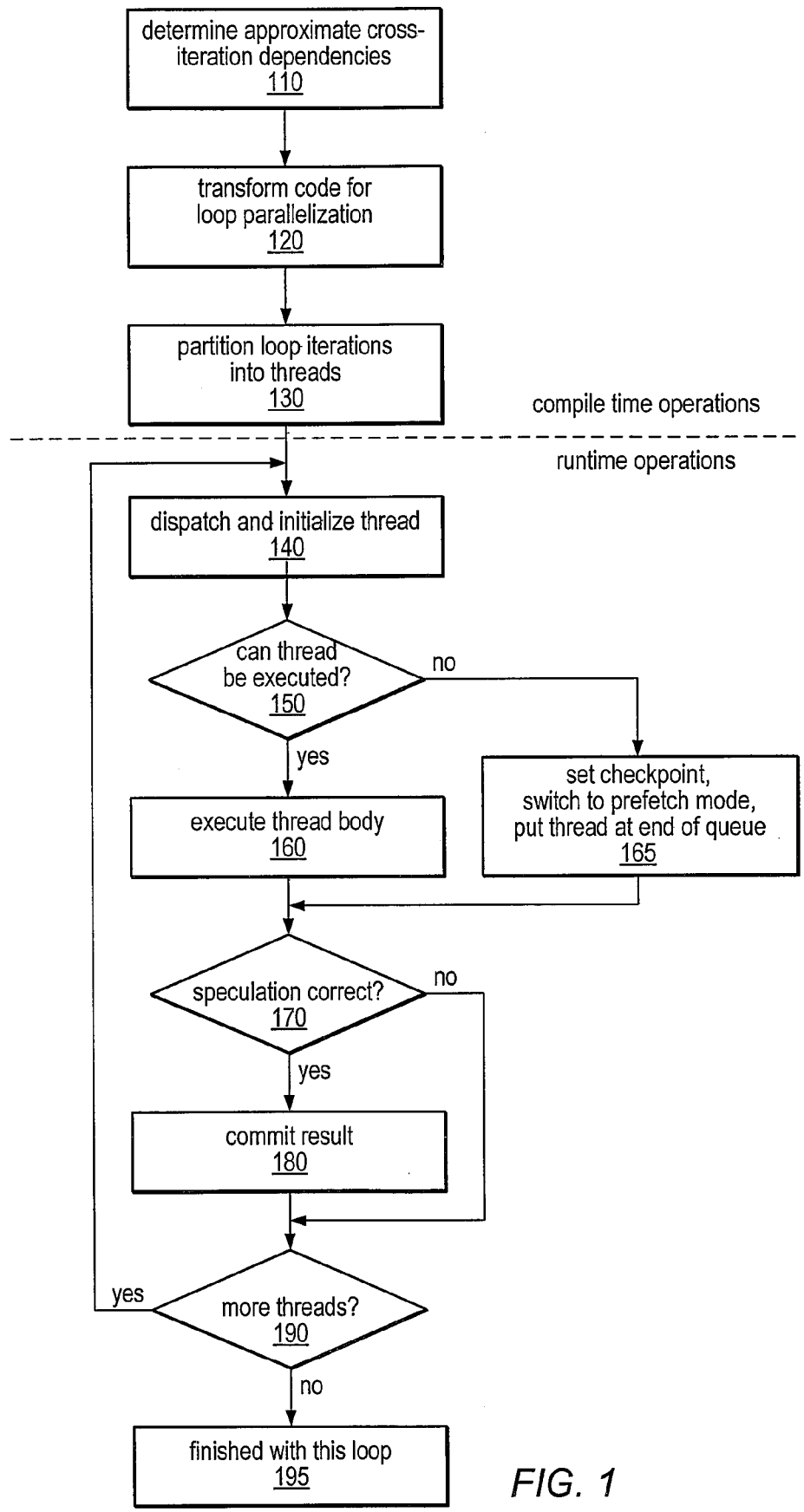
FIG. 1 illustrates a method for performing aggressive loop parallelization, according to one embodiment.

One embodiment of a method for aggressive loop parallelization of a software application is illustrated in FIG. 1. In this example, the method includes determining the approximate cross-iteration dependencies of the software application when and if aggressive loop parallelization is applied, as in 110. For example, a compiler analysis may be performed to identify potential flow dependence across iterations. Specifically, the result of the compiler dependence analysis may be that common variables between loop iterations that have potential dependencies are identified. In other words, load references that have potential dependencies on store operations performed in previous loop iterations are identified. This dependency analysis may be performed using an automatic syntax and/or semantic analysis or may be explicitly invoked via user directives from a programmer or program analyst, in different embodiments.

The exemplary method illustrated in FIG. 1 also includes transforming the software application code for loop parallelization, as in 120. In some embodiments, this may involve compiling loop iterations in such a way that initial registration of certain store reference addresses are placed at the beginning of each loop iteration, and that storing a value at these reference addresses is performed only if speculative loop execution is determined to have been correctly speculated. For example, in some embodiments a special "address_create" instruction may be inserted in the code stream at the beginning of the loop to register one or more store references corresponding to potentially dependent load operations. In such embodiments, a special "address_remove" instruction may be inserted at the point in the loop after which a store value may be committed and the corresponding registered store reference may be removed. In some embodiments, transforming the code may include replacing load instructions for operations having potential cross-iteration dependencies with a special load instruction, "spec_load". These special instructions are explained in more detail below.

As illustrated in FIG. 1, the method may include partitioning the loop iterations into threads, as in 130. For example, in some embodiments, the compiler may statically partition the loop iterations into threads. The loop iterations may be partitioned such that each thread may execute one or several iterations of a loop, in various embodiments. In some embodiments, this partitioning may be invoked with explicit user directives from an application programmer or analyst. For example, a compiler directive or switch similar to the "#omp" directive in the OpenMP™ Library may be used to fork two or more threads to execute the loop iterations in parallel.

Although FIG. 1 illustrates an embodiment in which code is transformed for loop parallelization and then the loop iterations are partitioned into threads, in other embodiments, partitioning of loop iterations may be performed before code transformation or these operations may be combined so that they are performed roughly concurrently. For example, partitioning and code transformation may be performed on one loop iteration at a time or for a group of iterations that may be part of a single thread. In another example, partitioning and code transformation may be performed as a code analysis exercise progresses, so that the operations illustrated in FIG. 1 as 110-130 are performed as part of combined operation for analyzing and preparing a software application for parallel loop execution. In one embodiment, code transformation may involve replacing the code of the original loop body with a function call for each loop iteration and/or thread. The function may perform the operations of the original loop body and may be added to the runtime library. In such an embodiment, a pointer to the function may be passed to the runtime library and the runtime library may launch each thread. At runtime, in this embodiment, for each thread, the parameters/arguments of the function may be calculated for the thread and passed to the runtime library through a function call. In the example illustrated by FIG. 1, code transformation may involve both replacing the original loop code with a series of runtime library calls and generating the function code to perform the operations of the original loop body code. The dashed line in FIG. 1 indicates that these operations may be performed at compile time, rather than at runtime.

At runtime, the first of these threads may be dispatched for execution, as in 140. In this example, each thread is divided into two explicit thread pipelining stages and an implicit write-back/recovery stage. The pipelining stages include an initialization stage and a stage in which the body of the iteration is executed (which may be referred to as a computation stage). As each thread is dispatched, it may in some embodiments also be initialized. Initialization of each thread may include executing the inserted code that registers store references for this iteration that have been identified as having potential cross-iteration dependencies. Although in the embodiment illustrated in FIG. 1, all loops are partitioned into threads before any are dispatched, in other embodiments threads may not be created until execution resources are available for their execution.

As illustrated in FIG. 1, after a given thread has been initialized, it may or may not be executed, as in 150. For example, if the given thread includes a load operation that may be dependent on a store operation of a previous iteration, but the previous iteration has not completed execution, the result of the load operation of the given thread may not be correct. Therefore, the method may include checking the current store reference registrations for uncompleted threads to see if there is a match between one of the store references and a load reference of the given iteration. For the first dispatched iteration, no such cross-iteration dependencies will exist, since there are no previous iterations on which to depend. If there are no matches between registered store references of any uncompleted threads and any load references of the given thread, as indicated by the positive exit from 150, the body of the given thread may be executed, in this example. This is shown as 160 of FIG. 1.

If, on the other hand, one or more matches are found between registered store references of any uncompleted threads and any load references of the given thread, the body of the given thread may or may not be executed. In the example illustrated in FIG. 1, if one or more such matches are found, as indicated by the positive exit from 150, the method may include setting a checkpoint and switching to a "pre-fetch" mode, after which execution may continue speculatively and/or the given thread may be placed back at the end of the current thread queue, as in 165.

In this example, switching to a pre-fetch mode may involve setting a flag to indicate that the given thread has an unresolved dependency on another iteration (thread) and/or allowing the instructions making up the body of the given iteration to be fetched and/or executed, even though the results of the execution may be discarded. In some embodiments, allowing the instructions making up the body of the given iteration to be fetched (e.g., from system memory) and/or executed may allow the instructions and/or preliminary results to be placed in cache memory. In such embodiments, when and if the instructions are re-executed following resolution of any cross-iteration dependencies, execution may proceed more quickly because the instructions and/or data have already been fetched into faster cache memory from system memory. In addition, in some embodiments, some or all of the preliminary results may be accessed following resolution of cross-iteration dependencies, and may not need to be re-generated during re-execution of the given iteration.

As noted above, speculative execution of the body of the given iteration may in various embodiments be performed by executing the body of the given iteration based on analysis results indicating that the given iteration is not dependent on a result from a different iteration, or by speculatively executing the body of the given iteration, assuming that any cross-iteration dependencies may be resolved before they are encountered. In either case, if the analysis is incorrect or if any identified dependencies are not resolved before the body of the given iteration is executed, the results of the speculative execution may be discarded and the body of the given iteration may be re-executed.

In the example illustrated in FIG. 1, setting a checkpoint may involve setting a checkpoint just prior to the first instruction in the given iteration that involves a cross-iteration dependency. In this way, when and if the given iteration is re-executed following resolution of this cross-iteration dependency, the instructions executed prior to the checkpoint may not need to be re-executed.

After executing the given thread body, the method may in some embodiments include checking the status of the speculative execution to see if it was correct, as in 170. In this example, checking the status of the speculation may involve determining if a flag is set indicating that the body of the given iteration was executed in pre-fetch mode. If the body of the given iteration was not executed in pre-fetch mode, as indicated by the positive exit from 170, any results of the execution of the body of the given iteration may be committed to the architectural state of the system, as in 180 (e.g., loads may be committed to memory). If the body of the given iteration was executed in a pre-fetch mode, as indicated by the negative exit from 170, the results may not be committed.

If there are any additional threads to be executed (whether new threads or threads placed back into the queue following incorrect speculation), the operations illustrated as 140 through 180 may be repeated for each of the other threads. This is illustrated as the positive exit from 190. Once all of the threads in the queue have been successfully executed (i.e., executed following resolution of any cross-iteration dependencies), the execution of this loop is complete, as in 195.

The simplified flow chart illustrated in FIG. 1 depicts one embodiment of the methods as they pertain to a single thread of a plurality of parallel threads. FIG. 1 illustrates this thread being dispatched, executed, verified, and committed before another thread is dispatched. However, in various embodiments, two or more threads may be dispatched for parallel execution before any of the threads have completed execution. This is illustrated in FIG. 2.

Figure 2:
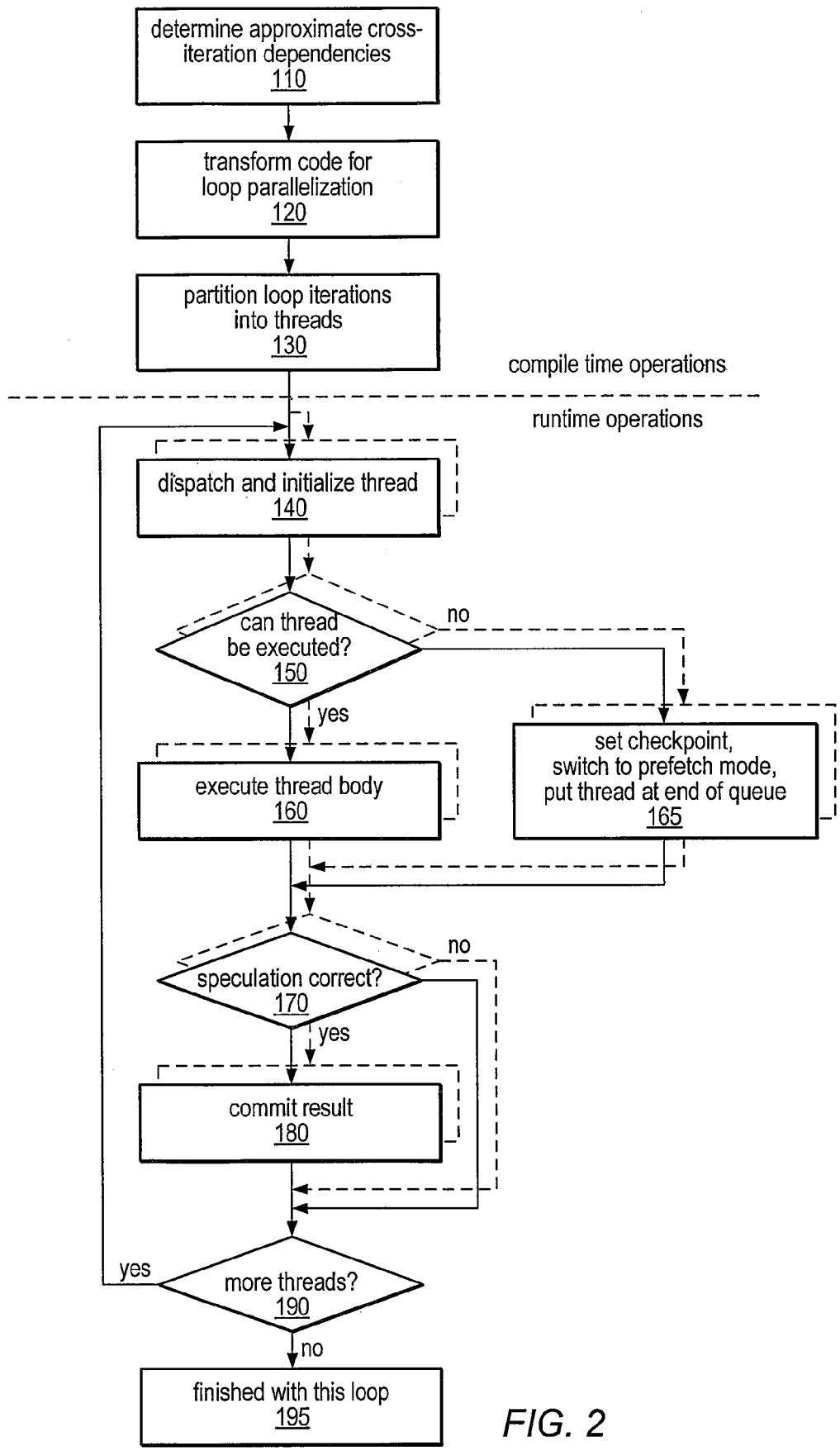
FIG. 2 illustrates a method for performing loop parallelization as applied two concurrently executing threads, according to one embodiment.

As shown in FIG. 2, after the application code has been analyzed and transformed for parallel execution, and after the loop iterations have been partitioned into threads, two threads may be dispatched in parallel. This is illustrated as two parallel paths following the operations of 110 through 130, each performing the operations illustrated as 140 through 180, in this example. The two parallel paths may be executed on different CPUs/strands, according to different embodiments, and may complete execution in any order. As discussed above, when each path is executed, if any cross-iteration dependencies are encountered that have not yet been resolved for the corresponding loop iteration, execution of the body of that loop iteration may be completed in pre-fetch mode and may have to be re-executed. As shown in FIG. 2, each time one of the paths/threads completes execution, at 180, an additional thread may be dispatched on the corresponding CPU/strand. In this example, it is not necessary that both paths/thread complete execution before another thread/iteration is dispatched. This is shown as the feedback loop from the single decision point 190 to the plurality of dispatch operations 140.

While the example illustrated in FIG. 2 depicts the dispatching of two threads/iterations for parallel execution, any number of threads/iterations may be dispatched for parallel execution. In some embodiments, the number of thread/iterations that may be dispatched and/or executed in parallel may be dependent on the number of CPUs/strands available and/or on the size of one or more tables or registries used by the methods described herein to track cross-iteration dependencies and their resolution.

While the methods described above may primarily be implemented in various software modules or functions, they may be supported by varying amounts of dedicated hardware, in different embodiments. For example, in one embodiment, low-level hardware support may include a global table T in which speculative store addresses may be cached, three special machine instructions, and one private table owned by each CPU/strand in which speculative stores may be cached. The three special instructions may perform the following functions:

1) address_create instruction—This instruction may be used to create an entry in table T based on its operand address. This instruction may be placed at the beginning of a thread (e.g., in an initialization code section) for each speculative store operation in the thread. For example, if there are N speculative stores in the loop, there may be N such address_create instructions, one per store reference.

2) address_remove instruction—This instruction may be used to remove an entry in table T based on its operand address. The instruction may be placed at a point in the loop code where it succeeds the speculative store instruction for the given operand address.

3) spec_load instruction—This instruction may replace the normal load instruction for speculative load operations in the loop. When executed, instead of loading a value from the location identified by the operand address, it may first cause a table look up to be performed that searches for an entry in table T corresponding to the operand address. If the entry exists, the thread may create a checkpoint and may change the state of the execution for the given thread so that it executes in pre-fetch mode, as described above. If the entry does not exist, the instruction may load the value from the location identified by the operand address and proceed normally.

The method for loop parallelization described herein may in some embodiments prevent the initialization code of one thread (i.e., all the instructions between the thread's entry point and its last address_create instruction) from overlapping with that of another thread in execution. Instead, in order to prevent race-conditions on table T, the initialization code of the threads may be executed serially and in order. In other words, the initialization portion of the $n^{th}$ thread may not begin execution until the initialization portion of the $(n-1)^{th}$ thread has completed execution. In other embodiments, the initialization code portion of each thread may be executed without regard to the initialization code portions of other threads, but the code in the body portion of each thread may not be executed until both the initialization code portions of the current thread (i.e., the current loop iteration) and the initialization code portion of the previous thread (i.e., one including the previous loop iteration) have completed execution.

Hardware mechanisms such as those described above may support instruction-level checkpointing/restarting and speculative execution of parallel threads each implementing one or more loop iterations, in various embodiments. As previously noted, the degree of parallelism may in some embodiments be dependent on the size of the table T, and/or on the number of CPUs or hardware strands available for executing the threads.

Figure 3:
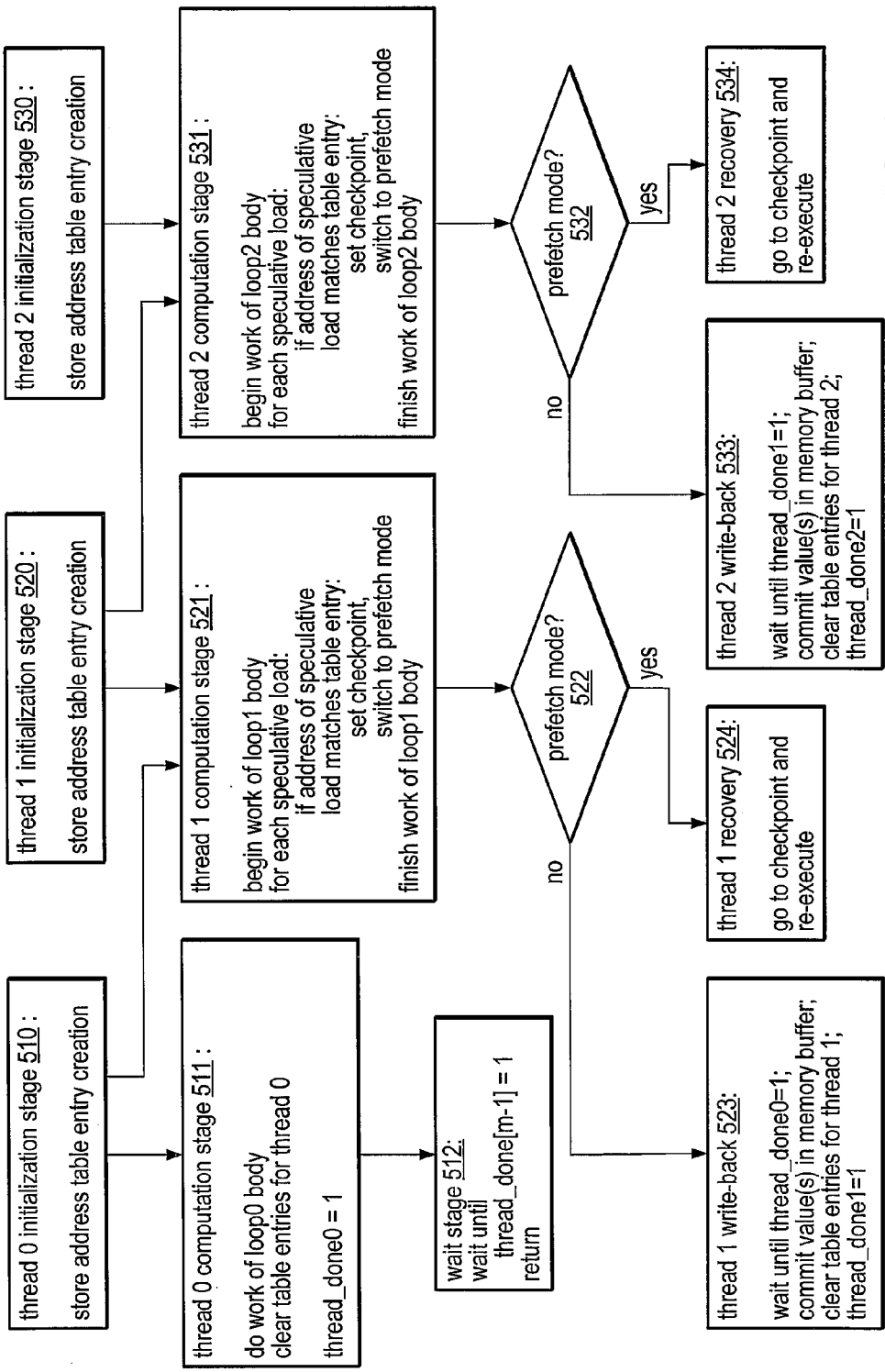
FIG. 3 illustrates a thread pipelining execution model used to enforce data dependence between three concurrent threads, according to one embodiment.

Parallel execution of several threads using the methods described herein may be further illustrated by the example depicted in FIG. 3. In this example, three threads are illustrated, although the methods may be applied to any number of threads. As illustrated in FIG. 3, a thread pipelining execution model may be used to enforce data dependence between concurrent threads. The execution of a thread in a multi-threaded mode may be partitioned into several stages, each of which performs a specific function. FIG. 3 illustrates the execution stages of a thread and the relationship between three concurrent threads, according to one embodiment.

In this example, a thread may be created and/or dispatched for the first iteration partition (i.e., thread 0) of an application transformed for parallel loop execution, and this thread may be placed at the end of a global thread queue. This global thread queue may in some embodiments be used to ensure that threads are dispatched and/or run in program order (similar to existing thread scheduling schemes implemented in the OpenMP™ library). In this example, threads may be created for the second and third iteration partitions (i.e., thread 1 and thread 2) at roughly the same time that thread 0 is created. However, in some embodiments, the threads may be dispatched for execution in order of their iteration index value (i.e., thread 0 may be dispatched first, followed by thread 1, and finally thread 2). The execution of each of the dispatched threads, however, may not complete in their original order, whether or not they were dispatched in their original order. For example, one loop iteration may be dispatched to a slower execution resource than another, may access a slower memory than another, or may perform a different number of operations than another depending on the results of calculations made and/or conditional branches or other operations of the loop body code. Therefore, the methods described herein may include checking data dependencies of speculatively executed loop iterations to ensure that results of a current loop iteration are not committed if there is an unresolved data dependency on an operation in a loop iteration that may precede the current loop in original program order, but that executed after the current loop iteration.

As illustrated in FIG. 3, when thread 0 is dispatched for execution, the first execution pipeline stage may be an initialization stage 510. In this stage, the addresses of store operations on which later concurrent threads may be data dependent may be calculated and stored in a global address table T. Calculating these addresses in the initialization stage and creating a table entry for each of them before beginning execution of the current loop iteration body may in some embodiments facilitate runtime data dependency checking, since these addresses may be available as early as possible for dependency checking during execution of subsequent loops. After thread 0 completes the store address generation stage, it may send a flag to a successor thread (e.g., thread 1) indicating that initialization of thread 0 is complete. This flag may be used to inform the successor thread that it may begin executing its computation stage (computation stage 521, in this example.)

In this example, the first thread (thread 0) may not be dependent on any subsequently executed loops (or any other loops). Therefore, once the initialization stage 510 is complete, execution of the body of loop0 may begin. This is illustrated as thread 0 computation stage 511. During execution of the body of loop0, once any speculative store operations are completed, their operand addresses may be removed from the global address table T. For example, the code making up the body of the loop0 iteration may include an address_remove instruction following the store operation for a given operand address. This instruction may cause the entry comprising the store address corresponding to the given operand address to be removed from the global address table T. The results of operations executed in computation stage 511 may in some embodiments be stored in a memory buffer (e.g., cached in a private table of the corresponding CPU/strand resource) until computation stage 511 completes execution.

At the end of computation stage 511, thread 0 may complete its execution by committing the results of its execution to the architectural state of the system. For example, in some embodiments, following completion of computation stage 511, thread 0 may write the result data (e.g., load operation data values) from a cache or other memory buffer to main memory. This first thread (thread 0) may also set a flag indicating that execution of the body of loop0 has completed. In this example, this is illustrated as the operation "thread_done0=1" at the end of computation phase 511. Note that to maintain the correct memory state, concurrent threads may be required to perform such write-back stages in their original order (i.e., in program order according to their loop index value). In FIG. 3, for example, thread 1 may wait for the thread_done0 flag to be set before performing its write-back at stage 523.

Note that in the example illustrated by FIG. 3, thread 0 may be considered a master thread, in that this thread may correspond to the initial loop invocation in the original program code and from which program control may return after all other loop iteration threads (i.e., slave threads) have been successfully executed. In this example, once thread 0 computation stage 511 has completed execution, thread 0 may invoke a wait stage 512. In wait stage 512, thread 0 may be configured to wait until the last thread (i.e., thread m−1, if the total number of threads is m) has successfully completed its execution before returning program control to the main program (e.g., the program, module, or function that included invocation of the original loop code.) In some embodiments, thread 0 may wait for a flag corresponding to completion of the last thread (and hence the last iteration in program order) to be set, such as thread done[m−1] illustrated in 512 of FIG. 3.

In the example illustrated in FIG. 3, when thread 1 is dispatched for execution, the first execution pipeline stage may be an initialization stage 520. In this stage, the addresses of store operations on which concurrent threads may be data dependent may be calculated and stored in global address table T. As noted regarding thread 0, calculating these addresses in an initialization stage and creating a table entry for each of them before beginning execution of the loop1 body may in some embodiments facilitate runtime data dependency checking, since these addresses may be available as early as possible for dependency checking during execution of subsequent loops (e.g., loop2 of thread 2). After thread 1 completes the store address generation stage, it may send a flag to a successor thread (e.g., thread 2) indicating that initialization of thread 1 is complete. This flag may be used to inform the successor thread (thread 2) that it may begin executing its computation stage (computation stage 531, in this example.)

In this example, one or more load operations of the second thread (thread 1) may be dependent on store operation results generated during execution of thread 0's computation stage 510. In some embodiments, thread 1 may not begin execution until both its own initialization stage 520 and the initialization stage of the previous iteration (thread 0 initialization stage 510, in program order) have completed.

Once initialization stage 520 is complete, execution of the body of loop1 may begin. This is illustrated as thread 1 computation stage 521. Note, however, that thread 0 computation stage 511 may not have competed execution before execution of thread 1 computation stage 521 begins. Therefore, one or more speculative stores of thread 0 may not have been completed (and their operand addresses removed from global address table T) before a speculative load of thread 1 corresponding to one of those operand addresses is encountered during execution of thread 1. One or more other speculative stores of thread 0 may have been completed before a corresponding speculative load operation of thread 1 is encountered and their operand addresses may have already been removed from global address table T (e.g., using an address_remove instruction, as described above.)

If the operand address of an upcoming speculative load operation in the body of loop1 matches that of an entry in global address table T, thread 1 may in some embodiments set a checkpoint corresponding to the speculative load operation and may switch to pre-fetch mode, as described above. In some embodiments, execution of the loop1 body may continue in the pre-fetch mode, which may allow faster execution when and if execution is re-started from the checkpoint. The results of operations performed while in pre-fetch mode may be stored in a memory buffer or cache, in some embodiments, while in other embodiments they may be ignored or discarded.

During execution of the body of loop1, once any speculative store operations are completed, their operand addresses may be removed from the global address table T. For example, the code making up the body of the loop1 iteration may include an address_remove instruction following the store operation for a given operand address. This instruction may cause the entry comprising the store address corresponding to the given operand to be removed from the global address table T. The results of operations executed in computation stage 521 may in some embodiments be stored in a memory buffer or cache, as described above, until computation stage 521 completes execution and its speculative execution is determined to be correct.

At the end of computation stage 521, thread 1 may check whether or not it is in pre-fetch mode, i.e., whether the current speculative thread results are correct or not. This is illustrated as decision point 522. If thread 1 is in pre-fetch mode, the thread may in some embodiments remain in the thread queue (or may be placed at the end of the thread queue) and may resume execution from the checkpoint when another CPU/strand resource is available, as in thread 1 recovery stage 524. In such embodiments, re-execution may involve repeating the operations illustrated in 521 and 522 beginning with the speculative load operation corresponding to the checkpoint and for all operations of the thread after the speculative load operation. If thread 1 is in pre-fetch mode, any results of computation stage 521 stored in a memory buffer or cache may be discarded or ignored, in various embodiments.

If thread 1 is not in pre-fetch mode when it completes computation stage 521, it may complete its execution by committing the results of its execution to the architectural state of the system. For example, in some embodiments, following completion of computation stage 521, thread 1 may write the result data (e.g., load operation data values) from a cache or other memory buffer to main memory, as in thread 1 write-back stage 523. As previously noted, in order to maintain the correct memory state, concurrent threads may be required to perform their write-back stages in their original (i.e., program) order. FIG. 3, therefore, illustrates that thread 1 may wait for the thread_done0 flag to be set before performing its write-back at stage 523. In some embodiments, the thread 1 write-back stage may also include setting a flag (e.g., thread_done1) to indicate that the current thread has completed its computation stage, as shown in 523, and forwarding this flag to a subsequent thread (e.g., thread 2). This flag may in some embodiments indicate to the subsequent thread that it may begin execution of its computation stage.

In the example illustrated by FIG. 3, a third thread (thread 2) may be dispatched at the same time as threads 0 and/or 1, or it may be dispatched at a later time (e.g., when a previous thread has completed and yielded its CPU/strand resource.) In this example, thread 2 may be executed in the same manner as that described above regarding thread 1. For example, thread 2 initialization stage 530 may begin when thread 2 is dispatched or after completion of initialization stage 520, in different embodiments. In this stage, speculative store operation addresses for thread 2 may be calculated and stored in global address table T. Execution of thread 2 computation stage 531 may in some embodiments begin after both thread 1 initialization stage 520 and thread 2 initialization stage 530 have completed.

As the execution of thread 2 computation stage 531 progresses, if the operand address of an upcoming speculative load operation matches that of an entry in global address table T, thread 2 may set a checkpoint corresponding to the speculative load operation and switch to pre-fetch mode, as described above. Execution of thread 2 computation stage 531 may continue (in normal or pre-fetch mode) and results of operations performed may be stored in a memory buffer or cache. Once thread 2 computation stage 531 completes execution, a check may be performed to determine if thread 2 is in pre-fetch mode, as in 532. If thread 2 is in pre-fetch mode, it may remain in (or be placed in) the thread queue and may resume execution from the checkpoint when another CPU/strand resource is available, as in thread 2 recovery stage 534. Any results of computation stage 531 stored in a memory buffer or cache may in some embodiments be discarded or ignored if thread 2 is in pre-fetch mode. If thread 2 is not in pre-fetch mode when it completes computation stage 531, it may complete its execution by committing the results of its execution to the architectural state of the system, as in thread 2 write-back stage 533. The write-back operation may be dependent on a flag from the previous thread (e.g., thread_done1) and may include setting a flag (e.g., thread_done2) to indicate to any subsequent threads that the body of loop2 has completed successfully and that a next thread may begin executing its computation stage.

Generally, whenever there is an idle strand or CPU core, the method may include looking for the first available and/or initialized thread on the thread queue, where the thread queue stores threads in order of their initialization (and hence in order of the loop index). If an initialized thread is found, the method may include executing that thread from its last checkpoint. If no such thread is found, the method may include creating a new thread for the next iteration. In some embodiments, if the initialization code for the next iteration can be executed, and/or if all previous iterations have finished their initializations, the method may include executing the initialization and proceeding to execution of the iteration body. If the initialization code for all previous iterations has not finished execution, the method may in some embodiments include taking a checkpoint (e.g., at the entry point to the initialization code) and putting this new thread at the end of the thread queue.

Checking whether all previous iterations have finished their initialization may in some embodiments be easily implemented using a global variable i, which indicates the index of the latest iteration that has completed its initialization. This variable may be set (or incremented by one) whenever an iteration has finished its initialization, in some embodiments. As previously noted, iteration threads may in some embodiments always be assigned to available CPU cores or strands in order of their indexing, so that the $n^{th}$ iteration may not be assigned to a strand for execution unless all previous threads (i.e., up to the $(n-1)^{th}$ iteration) have either completed execution, or are currently assigned to a strand and in execution.

The methods for speculative loop parallelization may be further described as they are applied to an example code segment. The code segment shown below may be a very time consuming loop of an application such as a benchmarking application. In this code segment, there are potential read-after-write data dependencies across loop iterations caused by the variable total_cost. This loop may be very difficult to transform for parallel execution using conventional software pipelining techniques due to imprecise alias information. However, this loop may be easily parallelized and executed speculatively using the methods and architecture support described herein.

```
for (icon = 0; icon < num_edges; icon++) {
    to_node = rr_node[inode].edges[icon];
    ...
    total_cost = pcost + rr_node_route_inf[to_node].cost;
    ....
}
```

In this example, compiler-transformed code for the speculative loop is shown below. In this transformation, the compiler uses a function mfunction to represent the computation in the speculative loop. This function may correspond to code included in a computation stage for a thread, as described above. In this example, the function pointer of this mfunction may be passed into a runtime library, and each thread may correspond to one or several loop iterations. The compiler may be responsible for preparing the actual arguments for each loop iteration/thread (e.g., the addressed of global/local variables, the lower bound, the upper bound, etc.), according to the thread id or loop index. As previously noted, the execution of each thread may in some embodiments be divided into two explicit thread pipelining stages (e.g., initialization and computation) and implicit write-back and recovery stages. The computation stage code may in some embodiments include instructions to implement checking the global address table to see if there is an entry corresponding to each speculative load operation. For example, the compiler may replace a normal load instruction with a special speculative load instruction (e.g., spec_load) in the function representing the computation stage. In some embodiments, this speculative load instruction may check the global address table before performing the speculative load and may set a flag to indicate that execution will continue in pre-fetch mode if a matching entry is found.

```
mfunction (thread_id, lower, upper,...)
{
    for (private_icon = lower; private_icon < upper; private_icon++) {
        to_node = rr_node[inode].edges[private_icon];
        ...
        /* Check global address table for total_cost entry. If found,
        set checkpoint
        and switch to pre-fetch mode (set pre-fetch flag). */
        total_cost = pcost + rr_node_route_inf[to_node].cost;
        ....
    }
}
```

The first thread, thread 0 in this example, may be referred to as the master thread. Execution of this thread may not be considered speculative, since it represents the first iteration in the original program order and therefore cannot depend on results of any other iteration. The initialization stage for thread 0 may include code for creating an entry in a global address table T for the variable total_cost, such as by using an address_create instruction. Exemplary code for the computation stage of this master thread is shown below. Some instructions are not included, but are represented by comments describing their function.

```
thread_start[1]=1    /* notify thread 1 to start work */
/* compute lower bound, upper bound for thread 0 */
mfunction(0, lower, upper,...)    /* call function, with thread_id = 0 */
thread_done[0] =1    /* indicate thread 0 computation complete */
while (thread_done[number_threads-1]==0)    /* wait for all other threads*/
```

In the example above, the flag thread_start may be set to notify the successor speculative thread that it may begin execution (e.g., in response to initialization of thread 0 being completed.) After thread 0 finishes its computation stage, it may in some embodiments automatically perform a write-back operation, as described above. In the example above, when the master thread completes its computation stage, it may wait for all subsequent threads to complete execution before returning from the master function call. This is similar to the method illustrated in FIG. 3 at 512.

Speculative threads other than the first thread may be referred to as slave threads. Slave threads may be data dependent on another concurrently executing thread, as discussed above. Exemplary code for a speculative slave thread is shown below.

```
while (!thread_start[thread_id];    /* wait for start flag for this thread */
/* compute lower bound, upper bound according to the thread_id */
mfunction (thread_id, lower, upper, ...); /* call function for this
thread_id */
if (pre-fetch) {
    /* go to the checkpoint */
}
else {
    while (thread_done[thread_id-1]==0); /* wait for predecessor
    thread */
    /* commit the value(s) in the memory buffer */
    thread_done[thread_id] =1; /* indicate thread 1 computation
    complete */
}
```

In this example, execution of a slave thread may not begin until the corresponding start flag (thread_start) is set. Once this flag is set, the slave thread may call the function representing its computation stage (mfunction, in this example.) After the slave thread finishes its computation stage, it may in some embodiments automatically perform the write-back and set a corresponding thread done_flag if the speculation is successful (i.e., if not in pre-fetch mode). Otherwise, it may in some embodiments go to a checkpoint and resume the execution from there.

In general, the approach to speculative loop execution described herein may use a combination of software methods (e.g., compiler functions) and hardware mechanisms to support aggressive loop parallelization. Because this approach may result in a finer granularity of conflict detection than traditional methods, it may waste very little time doing incorrect work. Therefore, it may be able to yield greater loop parallelism than conventional methods for loop parallelization, in some embodiments.

The system and method described herein for aggressive loop parallelization may be implemented in any combination of hardware (such as in one or more integrated circuits, each including at least one processor and a memory suitable for implementation of a compiler and/or a global address table), and software (e.g., executing on a single multi-threaded processor, on a multi-processor system or another device suitable for concurrent execution of two or more threads), according to various embodiments. The methods described herein may be partially or completely automated, in various embodiments, such that a compiler implementing the methods may analyze and transform the code of a target application for aggressive loop parallelization, and the transformed application may be executed using the methods without input from or knowledge of a programmer or other user. For example, the operating system, or other system software, may be configured to analyze the performance of an application and to determine if it may benefit from the application of the methods described herein. An optimizing compiler may then be invoked to transform the target application code to apply aggressive loop parallelization, as described herein. In some embodiments, a programmer or user may invoke the methods described herein by setting a compiler switch/directive or operating system parameter value to indicate that such an analysis should be performed and/or that the methods should be applied to a given target application.

A computing system capable of implementing aggressive loop parallelization, as described herein, may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. One computing system suitable for implementation of aggressive loop parallelization, as described herein, is illustrated in FIG. 4.

Figure 4:
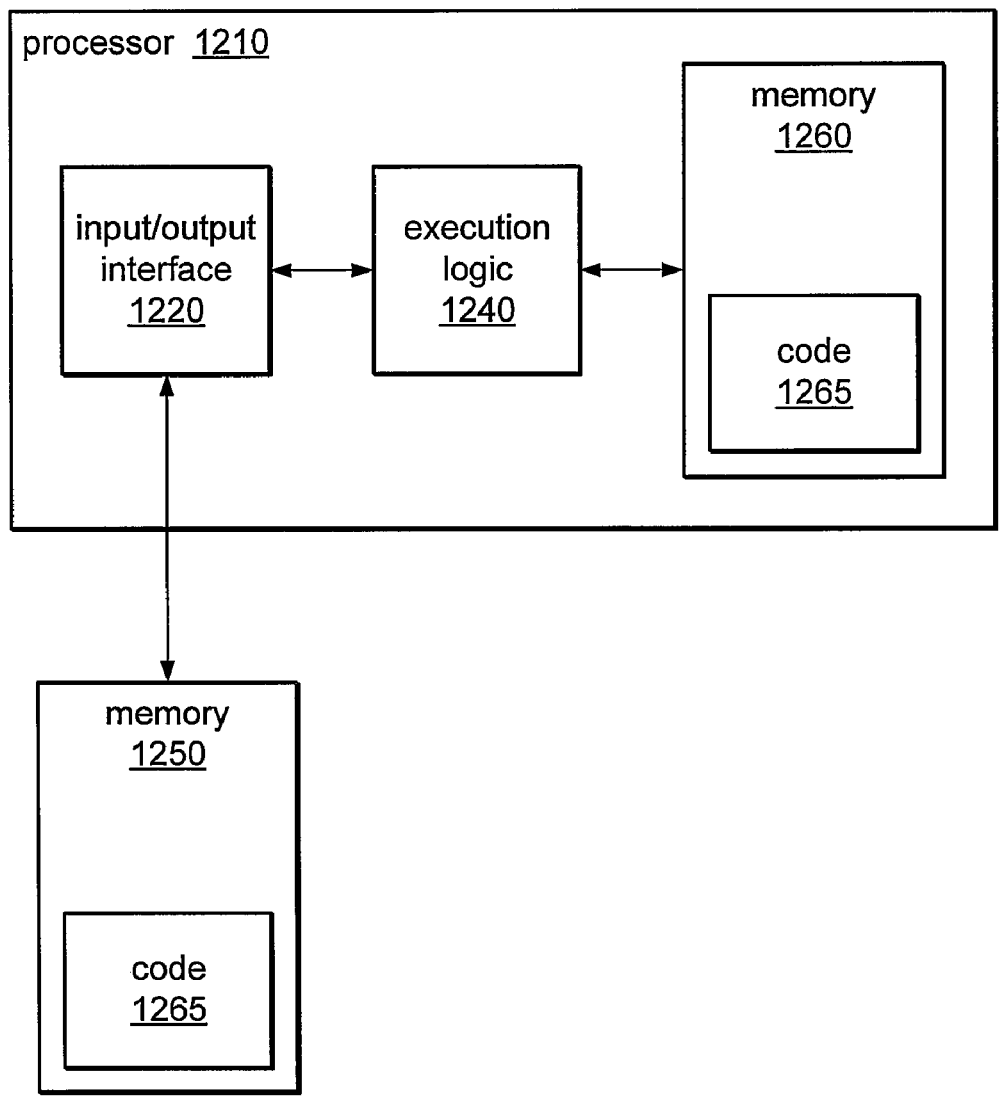
FIG. 4 illustrates one embodiment of a computing system suitable for implementing aggressive loop parallelization using speculative execution mechanisms.

In some embodiments, the methods described herein may be implemented in a combination of hardware and program instructions comprised in a memory 1250 or 1260 and executed by one or more processors, such as processor 1210 of FIG. 4. In the example illustrated by FIG. 4, processor 1210 may comprise an input/output interface 1220, execution logic 1240, and a memory 1260. In other embodiments, processor 1210 may include multiple input/output interfaces 1220 and/or memories 1260, and execution logic 1240 may be partitioned into two or more blocks of logic according to its functionality or other attributes.

In some embodiments, execution logic 1240 may include hardware, such as electronic circuits, configured to implement hardware support for aggressive loop parallelization, as described herein. For example, execution logic 1240 may include electronic circuits configured to implement the three specialized instructions described above (i.e., address_create, address_remove, and spec_load). Execution logic 1240 may also include logic configured to implement other functionality of processor 1210, e.g., address calculation, instruction fetch and execution, arithmetic calculations, Boolean calculations and manipulations, digital signal processing, or any other functionality of a general-purpose or special-purpose processor, according to various embodiments. For example, execution logic 1240 may be configured to allow processor 1210 to implement any of various instruction set architectures, such as x86, SPARC, PowerPC, etc. In some embodiments, execution logic 1240 may be configured to implement a single CPU core, multiple CPU cores, or any combination of one or more general-purpose CPU cores and special-purpose cores (e.g., digital signal processors, hardware accelerators, co-processors, etc.) In various embodiments, execution logic 1240 may be configured to implement a superscalar architecture or may be configured to implement multi-threading.

In some embodiments, the methods described herein may be implemented largely in software, i.e., by program instructions stored in memory 1260 or memory 1250 and executed by processor 1210. These program instructions may be part of an operating system, compiler, or other system software program configured to implement the analysis, transformation, and/or execution of a target application using speculative loop execution as described herein. Such program instructions are shown in FIG. 4 as code 1265 stored within memory 1260 and memory 1250. Memory 1260 and/or 1250 may also be configured to implement a global address table T and/or one or more private tables each owned by a CPU/strand and in which speculative stores may be cached.

In some embodiments, memory 1260 may be a cache memory of processor 1210. In still other embodiments, the methods may be implemented largely by program instructions and/or tables stored in another type of computer-readable medium, such as memory 1250, which may or may not be separate from processor 1210, and executed/accessed by processor 1210. Examples of such computer-readable media include, but are not limited to, installation media, e.g., a CD-ROM or floppy disk, computer system memory such as DRAM, SRAM, EDO RAM, SDRAM, DDR SDRAM, Rambus RAM, flash memory, etc., or non-volatile memory such as a magnetic media, e.g., a hard drive or optical storage. In one embodiment, program instructions configured to implement the methods described herein may be stored in memory co-located with processor 1210 on a circuit board and/or on a computing node of a multi-node computing system. In some embodiments, the operations and functions comprising the methods (e.g., program instructions and tables) may be partitioned between local memory, such as memory 1260 or other memory local to a processor node comprising processor 1210, and non-local memory, such as memory 1250. The functionality described herein may be implemented in any of various programming languages In some embodiments, input/output interface 1220 may be configured to couple processor 1210 directly to memory 1250 or to a computer system network. In other embodiments, input/output interface 1220 may be configured to couple processor 1210 to a network interface, such as a network interface on a processor node or a hybrid node (not shown). In some embodiments, input/output interface 1220 may be configured to implement one or more of various interface or network standards, e.g., Peripheral Component Interconnect (PCI), Ethernet, HyperTransport (HT), Infiniband, or any variant or successor of these or other suitable input/output protocols. In some embodiments, input/output interface 1220 may incorporate some or all of the functionality of a network interface (not shown). In other embodiments, some or all of the functionality of input/output interface 1220 may be included in a network interface (not shown), rather than in processor 1210.

The functionality of step referred to herein may correspond to the functionality of hardware or software modules or portions of hardware or software modules, according to various embodiments. The operations referred to herein may be modules or portions of modules (e.g., software, firmware, or hardware modules), according to various embodiments. For example, software modules implementing the methods described herein may include source, script, batch or other executable files, or combinations and/or portions of such files. In some embodiments, software modules implementing the methods may include a computer program or subroutines thereof encoded on one or more computer accessible media.

Additionally, those skilled in the art will recognize that the boundaries between modules and/or components are merely illustrative and alternative embodiments may merge modules/components or impose an alternative decomposition of functionality of modules and components. For example, the modules discussed herein may be decomposed into sub-modules to be executed as multiple computer processes or to be implemented as multiple hardware components (such as integrated circuits and/or printed circuit boards). Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention, according to various alternate embodiments.

Thus, the flows described herein, the operations thereof and modules therefore may be implemented in hardware on a computer system configured to execute the operations of the flows and/or may be implemented in software executed by the computer system from computer accessible media, according to various embodiments. In some embodiments, the flows may be embodied in a machine-readable and/or computer accessible medium (e.g., a computer-readable storage medium) for configuring a computer system to execute the flows, as described above. Thus, one or more software modules implementing all or part of the methods described herein may be stored within and/or transmitted to a computer system memory to configure the computer system to perform the functions of the module(s), according to various embodiments.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer-implemented method, comprising:
    analyzing program instructions comprising a loop to identify one or more load operations in the body of each loop iteration that are data dependent on store operations in the body of another loop iteration;
    transforming the program instructions to produce transformed program instructions such that two or more loop iterations of the transformed program instructions are executable in parallel, wherein said transforming comprises:
        adding one or more additional program instructions to the program instructions that are to be executed prior to executing the body of the loop, wherein the additional program instructions implement a thread initialization stage; and
        replacing, in the body of the loop, a load instruction corresponding to an identified load operation with an alternate load instruction;
        wherein specification of the one or more additional program instructions is dependent on the one or more load operations identified by said analyzing;
    partitioning loop iterations of the transformed program instructions into two or more threads, wherein each thread comprises one or more loop iterations and is configured for concurrent execution; and
    for each of said two or more threads:
        dispatching the thread for execution on a processor or strand resource;
        speculatively executing a loop iteration in the thread, wherein said speculatively executing the loop iteration comprises executing the one or more additional program instructions prior to executing the body of the loop iteration and executing the body of the loop iteration;
        determining whether an identified load operation in the loop iteration is dependent on results of a store operation in a different thread that has not yet completed execution, wherein said determining is dependent on results of said executing the one or more additional program instructions; and
        validating preliminary results of said speculatively executing the loop iteration if no load operations in the loop iteration are dependent on results of a store operation in a different thread that has not yet completed execution;

wherein the alternate load instruction is executable to:
prior to the identified load operation being performed, perform said determining whether the identified load operation of the thread is dependent on results of a store operation of a different thread that has not yet completed execution; and
subsequent to said determining whether the identified load operation of the thread is dependent on results of a store operation of a different thread that has not yet completed execution, unconditionally perform the identified load operation.

2. The method of claim 1, further comprising:
in response to determining that an identified load operation in one loop iteration of a given thread is dependent on results of a store operation in a different thread that has not yet completed execution:
setting a checkpoint corresponding to the identified load operation; and
completing execution of the given thread in a pre-fetch mode without validating preliminary results of the identified load operation.

3. The method of claim 2, further comprising re-executing at least a portion of the given thread beginning at the checkpoint subsequent to said completing execution of the given thread in the pre-fetch mode.

4. The method of claim 1,
wherein as part of the thread initialization stage the one or more additional program instructions are executable to perform:
for each of a plurality of store operations of the thread on which a load operation of a different thread is dependent, creating an entry in a global address table that is accessible by the two or more threads, the entry comprising an operand address corresponding to the store operation.

5. The method of claim 4, further comprising removing an entry in the global address table in response to execution of the store operation corresponding to the operand address in the entry.

6. The method of claim 4, wherein said determining if a load operation of the thread is dependent on results of a store operation of a different thread that has not yet completed execution comprises determining if an operand address of the load operation of the thread matches the operand address in an entry in the global address table.

7. The method of claim 1, wherein as part of the thread initialization stage the additional program instructions are executable to create an entry for a store operation on which a load operation of another loop iteration is dependent in a global address table that is accessible by the two or more threads.

8. The method of claim 1, wherein said transforming the program instructions further comprises adding additional program instructions to the loop that are executable to remove an entry from a global address table that is accessible by the two or more threads following a store operation corresponding to the entry.

9. The method of claim 1,
wherein said speculatively executing is performed in response to determining that a thread comprising a loop iteration having a loop index smaller than a loop index of the loop iteration has completed execution of its initialization stage.

10. The method of claim 1, further comprising the processor or strand resource on which each thread is dispatched for execution storing in a memory preliminary results of store operations of the thread on which load operations of another thread are dependent.

11. The method of claim 1, wherein said two or more threads are dispatched in program order according to a loop index of the program instructions, further comprising:
the first of the two or more threads dispatched waiting until all other threads of the two or more threads complete execution; and
the first of the two or more threads dispatched completing execution in response to all other threads of the two or more threads completing execution.

12. A system, comprising:
a processor configured for multi-threaded execution; and
a memory comprising program instructions executable by the processor to implement:
analyzing program instructions of a target application comprising a loop to identify one or more load operations in the body of each loop iteration that are data dependent on store operations in the body of another loop iteration;
transforming the program instructions of the target application to produce transformed program instructions such that two or more loop iterations of the transformed program instructions are executable in parallel, wherein said transforming comprises adding one or more additional program instructions to the program instructions that are to be executed prior to executing the body of the loop, wherein the additional program instructions implement a thread initialization stage, and wherein specification of the one or more additional program instructions is dependent on the one or more load operations identified by said analyzing; and
partitioning loop iterations of the transformed program instructions into two or more threads, wherein each thread comprises one or more loop iterations and is configured for concurrent execution; and
for each of said two or more threads:
dispatching the thread for execution on a processing resource of the processor;
speculatively executing a loop iteration in the thread, wherein said speculatively executing the loop iteration comprises executing the one or more additional program instructions prior to executing the body of the loop iteration and executing the body of the loop iteration;
determining if an identified load operation in the loop iteration is dependent on results of a store operation in a different thread that has not yet completed execution, wherein said determining is dependent on results of said executing the one or more additional program instructions;
validating preliminary results of said speculatively executing the loop iteration if no load operations in the loop iteration are dependent on results of a store operation in a different thread that has not yet completed execution;
wherein the memory stores one or more entries in a global address table that is accessible by the two or more threads, each entry corresponding to a store operation on which load operations of another thread are dependent and comprising an operand address of the store operation; and
wherein as part of the thread initialization stage the additional program instructions are executable to create an entry in the global address table for a store operation on which a load operation of another loop iteration is dependent.

13. The system of claim 12, wherein the memory is configured to store preliminary results of store operations of each thread on which load operations of another thread are dependent.

14. The system of claim 12, wherein the memory further comprises program instructions executable by the processor to implement:
   in response to determining that an identified load operation in one loop iteration of a given thread is dependent on results of a store operation in a different thread that has not yet completed execution:
   setting a checkpoint corresponding to the identified load operation; and
   completing execution of the given thread in a pre-fetch mode without validating preliminary results of the identified load operation.

15. The system of claim 12, wherein said transforming the program instructions further comprises replacing, in the body of the loop, a load instruction corresponding to an identified load operation with an alternate load instruction, wherein the alternate load instruction is executable to:
   prior to performing the identified load operation, perform said determining if the identified load operation of the thread is dependent on results of a store operation of a different thread that has not yet completed execution; and
   perform the identified load operation.

16. The system of claim 12,
   wherein said transforming the program instructions of the target application further comprises adding additional program instructions to the loop that are executable to remove an entry from the global address table following a store operation corresponding to the entry.

17. A non-transitory, computer-readable storage medium comprising program instructions computer-executable to implement:
   analyzing program instructions of a target application comprising a loop to identify one or more load operations in the body of each loop iteration that are data dependent on store operations in the body of another loop iteration;
   transforming the program instructions of the target application to produce transformed program instructions such that two or more loop iterations of the transformed program instructions are executable in parallel, wherein said transforming comprises adding one or more additional program instructions to the program instructions that are to be executed prior to executing the body of the loop, wherein the additional program instructions implement a thread initialization stage, and wherein specification of the one or more additional program instructions is dependent on the one or more load operations identified by said analyzing; and
   partitioning loop iterations of the transformed program instructions into two or more threads, wherein each thread comprises one or more loop iterations and is configured for concurrent execution; and
   for each of said two or more threads:
      dispatching the thread for execution on a processing resource of the processor;
      speculatively executing a loop iteration in the thread, wherein said speculatively executing the loop iteration comprises executing the one or more additional program instructions prior to executing the body of the loop iteration and executing the body of the loop iteration;
      determining if an identified load operation in the loop iteration is dependent on results of a store operation in a different thread that has not yet completed execution, wherein said determining is dependent on results of said executing the one or more additional program instructions;
      validating preliminary results of said speculatively executing the loop iteration if no load operations in the loop iteration are dependent on results of a store operation in a different thread that has not yet completed execution;
   wherein said transforming the program instructions of the target application further comprises adding additional program instructions to the loop that are executable to remove an entry from a global address table following a store operation corresponding to the entry, wherein the global address table is accessible by the two or more threads, and wherein the global address table stores one or more entries, each corresponding to a store operation on which load operations of another thread are dependent and comprising an operand address of the store operation.

18. The storage medium of claim 17, further comprising program instructions computer-executable to implement:
   in response to determining that an identified load operation in one loop iteration of a given thread is dependent on results of a store operation in a different thread that has not yet completed execution:
   setting a checkpoint corresponding to the identified load operation; and
   completing execution of the given thread in a pre-fetch mode without validating preliminary results of the identified load operation.

19. The storage medium of claim 17,
   wherein as part of the thread initialization stage the additional program instructions are executable to create an entry in the global address table for a store operation on which a load operation of another loop iteration is dependent; and
   wherein said transforming the program instructions of the target application further comprises replacing a load instruction corresponding to an identified load operation with an alternate load instruction, wherein the alternate load instruction is executable to:
      prior to performing the identified load operation, perform said determining if the identified load operation of the thread is dependent on results of a store operation of a different thread that has not yet completed execution; and
      perform the identified load operation.

* * * * *